Aug. 1, 1950     N. L. DAVIS     2,516,962
MINERAL SEPARATION APPARATUS AND PROCESS
Filed April 27, 1948     4 Sheets-Sheet 4
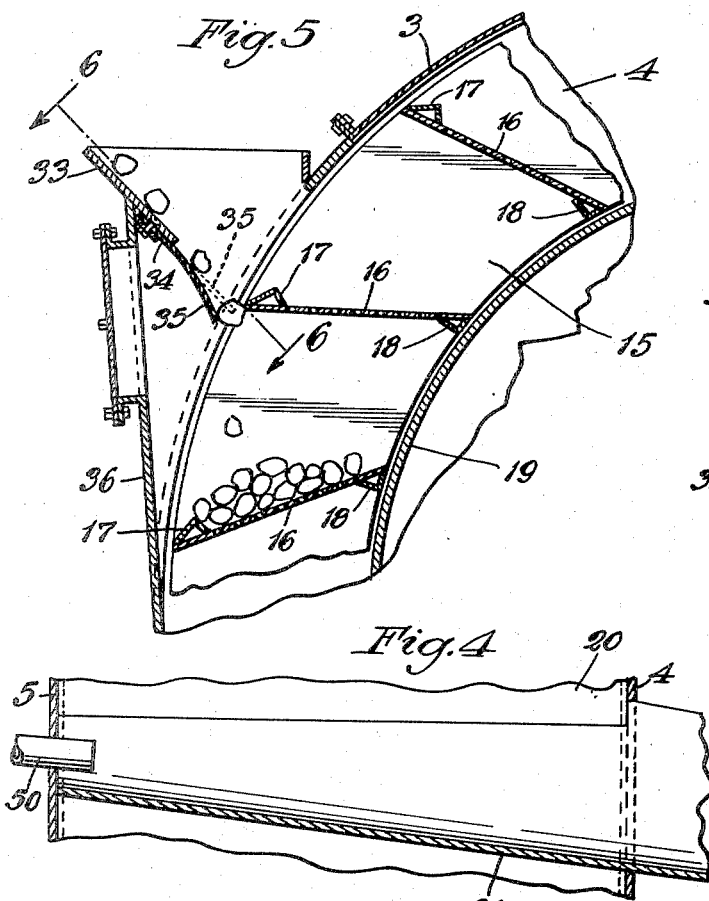
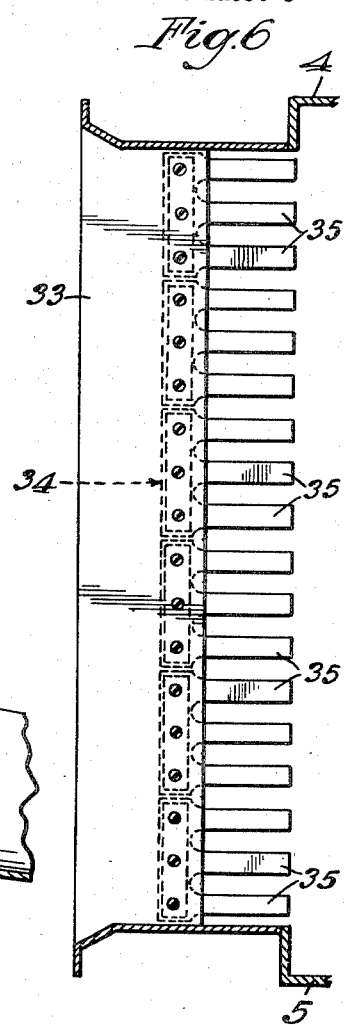
Inventor
Nelson L. Davis
by Parker & Carter
Attorneys Patented Aug. 1, 1950

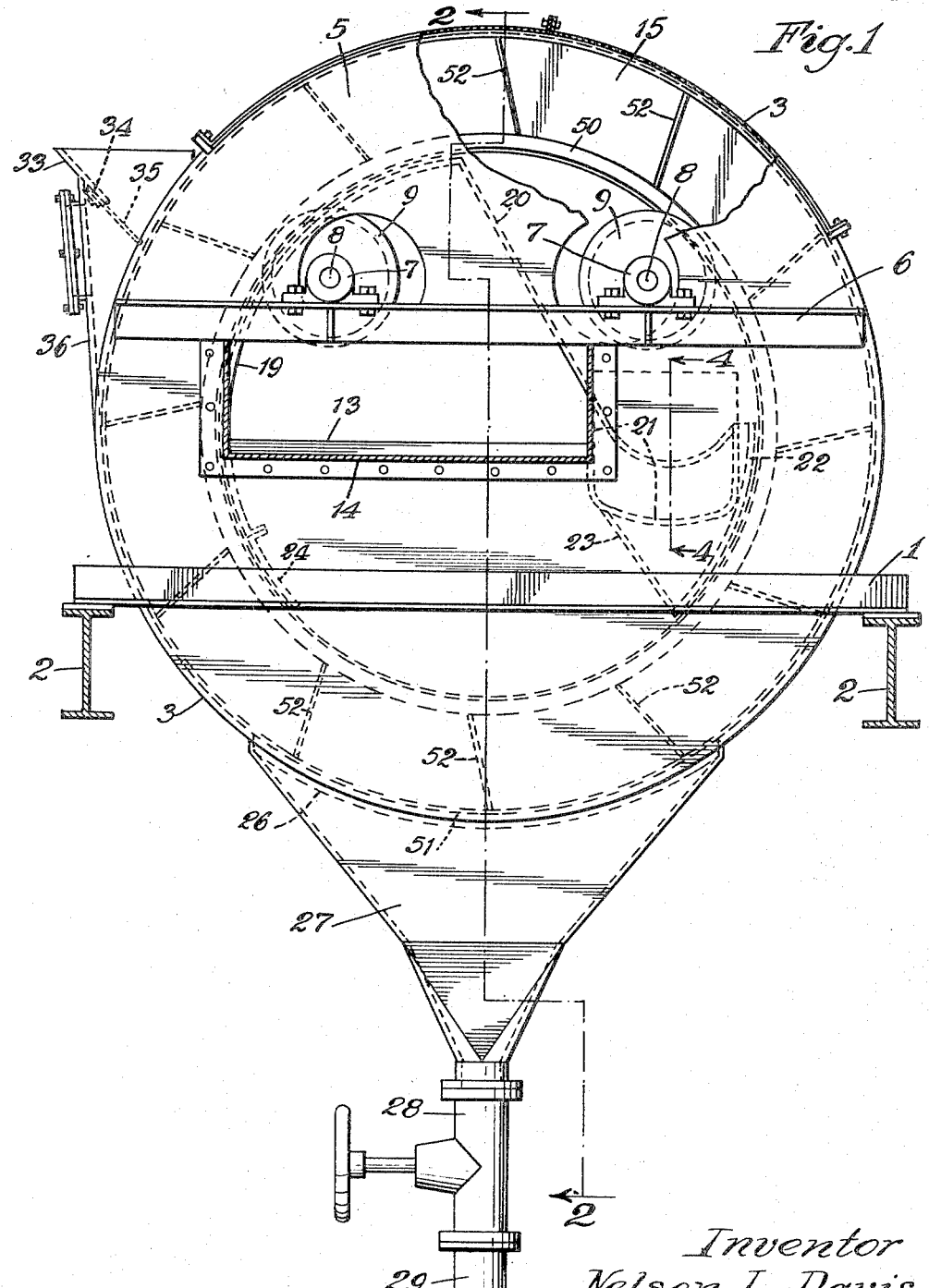

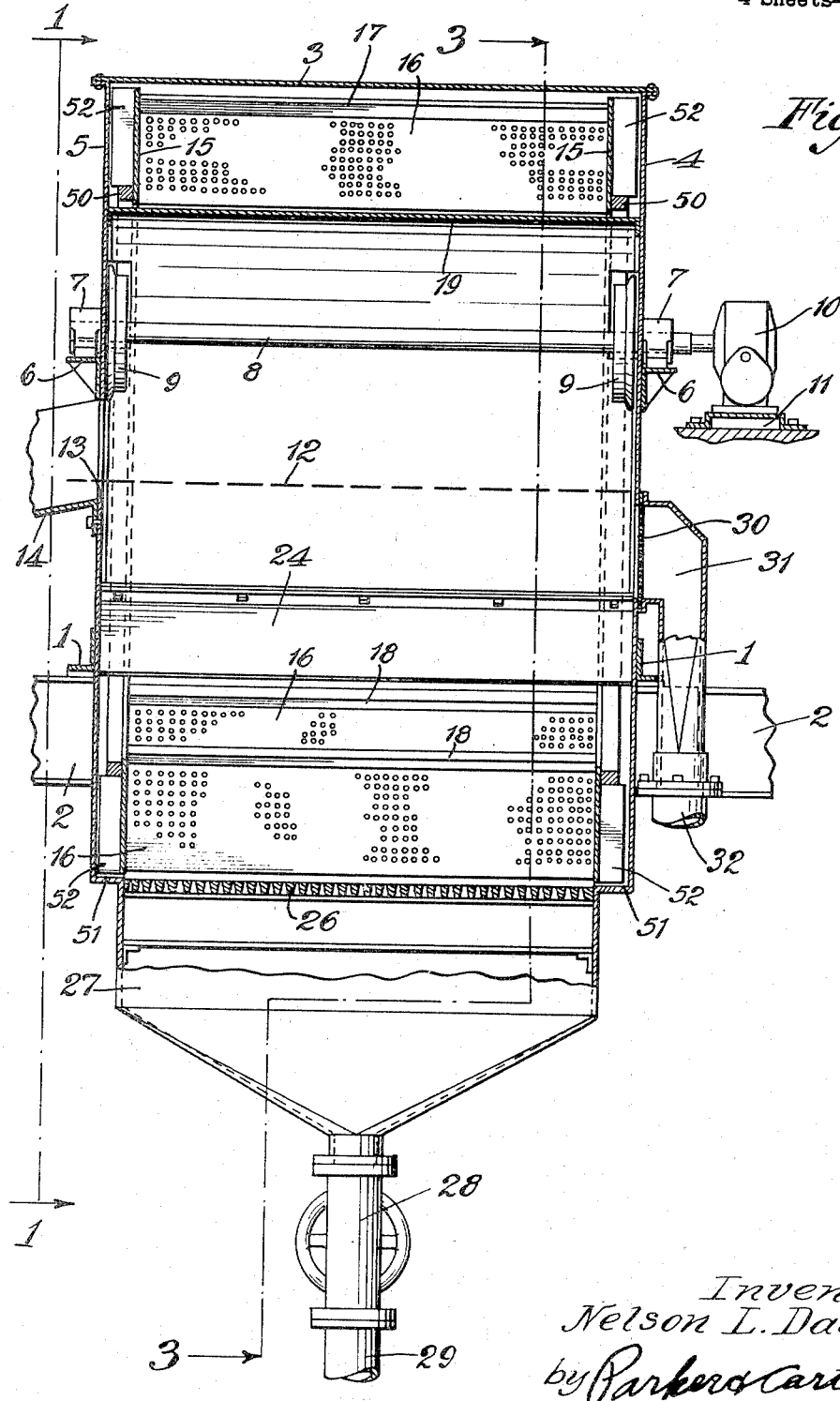

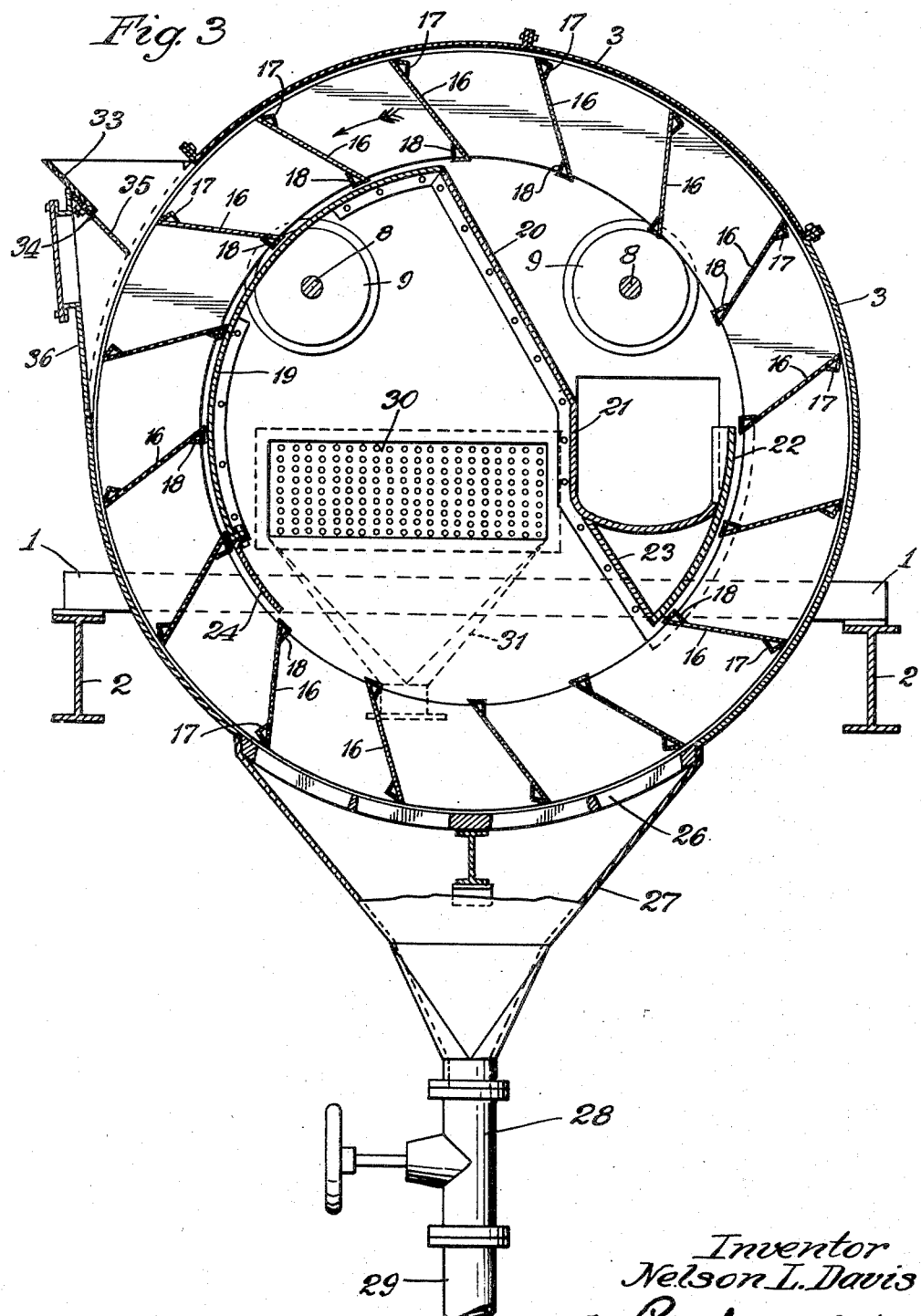

2,516,962

UNITED STATES PATENT OFFICE 2,516,962

MINERAL SEPARATION APPARATUS AND PROCESS

Nelson L. Davis, Chicago, Ill.

Application April 27, 1948, Serial No. 23,603

11 Claims. (Cl. 209—173)

My invention relates to improvements in mineral separation apparatus and process and has for one object to provide an apparatus and process which can be used for the float and sink separation of such minerals as coal and the like from refuse having a different specific gravity.

Another object of the invention is to provide a process and apparatus which can be used for the gravity separation of such minerals independent of and without regard to the size of the particles.

Another object of the invention is to provide such a separating apparatus and process as can be used with a very small proportion of flotation liquid with reference to the weight and volume of the solids being treated.

This application is based on my co-pending application, Serial No. 762,720, filed July 17, 1947, and discloses an improved wheel flight arrangement and other features which, experience has taught, add substantially to the effectiveness of the device.

My invention is illustrated more or less diagrammatically in the accompanying drawing, wherein:

Figure 1 is a side elevation in part section along the line 1—1 of Figure 2;

Figure 2 is a section along the line 2—2 of Figure 1;

Figure 3 is a section along the line 3—3 of Figure 2;

Figure 4 is a section along the line 4—4 of Figure 1;

Figure 5 is a section on an enlarged scale through the feed chute and associated parts;

Figure 6 is a section on an enlarged scale along the line 6—6 of Figure 5;

Figure 7 is a detail section on an enlarged scale showing a modified form of flight.

Like parts are indicated by like characters throughout the specification and drawings.

I have illustrated my invention as applied to a generally cylindrical flat ended vessel in which is contained a rotary peripherally open wheel or ring member having inclined blades extending outwardly and forwardly in the direction of rotation and wherein material to be separated by the sink and float method is introduced at the outer periphery of the wheel and the material, both sink and float, is separately discharged from the tank; the float passing over a weir at one end thereof and the sink passing thru a sluiceway which may discharge at the same end or opposite end thereof with respect to the float. Both discharge points are within the periphery of the wheel.

1, 2 indicates a supporting structure for my vessel. The vessel itself comprises a generally cylindrical housing 3 having end walls 4, 5 which are attached to the supporting framework 1. Carried by the end walls 4, 5 is a structure 6 carrying bearings 7 to support shafts 8 on which are mounted rollers or wheels 9. One of the shafts 8 extends beyond the end walls and is adapted to be driven by any suitable power means to frictionally rotate the wheel. Such means are illustrated by a motor 10 mounted on any suitable base 11, details of which are not here shown as they form no part of my present invention. The cylinder 3 and the end walls 4, 5 define a liquid containing reservoir, the liquid level of which is shown at 12 and is fixed by the weir 13, discharging into a recovery chute 14 through the wall 5. The weir is, of course, at such distance below the liquid level as will permit the discharge over the weir of the float material borne by the discharged liquid.

Supported on the rollers 9 is a conveyor wheel comprising two annular rings 15, one adjacent each of the walls 4, 5, the rings being joined by conveyor flights 16, reinforced along the inboard and outboard edges by angle members 17, 18. The wheel normally rotates in a counter-clockwise direction when viewed in Figures 1 and 3 so the flights are inclined forwardly and outwardly in the direction of the movement of travel of the wheel.

Contained within the vessel, closely adjacent to the inner periphery of the conveyor wheel is a curved guide plate 19. This plate extends counter-clockwise from approximately 12 o'clock, considering Figure 3 as a clock face, down to approximately 8 o'clock and across between the end walls 4, 5. Extending downwardly from the upper extremity of the curved guide plate 19 is a flat plate or chute 20 which lies along a cord of the circle and terminates at the refuse trough 21 which chute extends out through the end wall 4 or alternatively through the end wall 5. On the other side of the refuse trough 21 is a shorter curved guide plate 22 concentric with and adjacent the inner periphery of the conveyor wheel and at its lower end, joining an upwardly and inwardly inclined deflector plate 23 which meets the lower outer edges of the refuse chute 21; the plates 22, 23 being joined at the ends to the vessel ends 4, 5. 24 is a removable extension plate in prolongation of the curved plate 19. It extends from end to end between the vessel ends 4, 5 and is removably mounted below the lower extremity of the curved plate 19.

The periphery of the cylindrical vessel wall 3 at the lower portion thereof is perforated as indicated at 26. The perforated portion being in register with the fluid distribution hopper 27 which receives liquid through the control valve 28 from any suitable supply source 29.

On the side of the vessel opposite to the refuse trough 21 and recovery chute 14, is a perforated panel 30 associated with a liquid distribution box 31 which receives liquid through the pipe 32 from any suitable source of supply not here illustrated. The perforations in the plate 30 are all below the normal liquid level of the vessel and the purpose of this arrangement is to provide a transverse current of liquid across the vessel adjacent the upper liquid level and toward the discharge weir 13 to cooperate with the upward flowing current of liquid which enters through the perforations in the perforate plate 26.

It will be remembered that this is a float and sink apparatus not a hindered settling apparatus, that by means not here illustrated or disclosed since it forms no part of my invention, the liquid in the vessel is loaded for example, with finely divided magnetite which in finely divided condition, has a very low sinking rate. The liquid with magnetite in suspension is introduced into the vessel from below at a rate of speed such that the upward current through the vessel is not less than the settling rate of the magnetite. This will maintain an even body of liquid in the vessel with uniform concentration of magnetite and so uniform density and the rate of upward travel will be so low that it will have little if any effect on the settling and will not subject the liquid to any appreciable current effect, leaving the solids free to sink or float as the case may be in response to their normal specific gravity and independent of particle, size or shape.

The material which is to be subjected to the sink and float treatment will, in the vessel be separated and the float material will pass out over the weir with the liquid. The heavy material will be elevated from the bottom of the vessel by the conveyor flights, and discharged into the refuse chute and so leave the system with a minimum loss of liquid, such loss being only that liquid which remains adhering to the refuse itself.

As the refuse is discharged into the sluice or chute 21, having been raised out of the fluid medium, even though there will be some fluid still on the various particles, it will be so dry that it will not flow down the gradually inclined floor of the chute, therefore, these rejects are sluiced along the chute by a stream of the heavy medium which enters through the pipe 50 to wash the material down to discharge. Heavy medium rather than water is used for this purpose because otherwise the heavy medium in the system would be too greatly diluted.

The solids to be treated are introduced into the apparatus through a feed hopper 33 which extends inwardly to the outer periphery of the cylindrical housing 3 and discharges into the annular space between the cylindrical housing 3 and the guide plate 19 so that the material fed into the hopper passes into the vessel entering but not filling the spaces between the conveyor flights 16. 34 is a yielding floor for the hopper which extends inwardly and downwardly in prolongation of the solid hopper floor. It comprises plurality of separate spaced spring fingers 35 which terminate adjacent the outer periphery of the conveyor wheel. The cylindrical wall 3 has a tangential extension 36 terminating at the solid floor of the hopper beyond the spring floor. This permits the discharge of small particles between the fingers along the gradual slope 36 into the space occupied by the wheel and permits larger particles which might be caught between the flights and the wall of the chute to deflect one tine of the spring fingers to enter the vessel without damaging the apparatus or degradation of material.

In the modified form shown in Figure 7, the inboard edge of the flight as at 38 is forwardly curved and reinforced by an angle member 39 so as to give a somewhat sharper cutting edge to reduce friction and tend to lift rather than drag the material along the inner periphery of cylindrical housing wall 3 as the refuse is carried up to the discharge trough.

Although I have shown an operative form of my invention, it will be recognized that many changes in the form, shape and arrangement of parts can be made without departing from the spirit of the invention, and my showing is therefore to be taken as, in a sense, diagrammatic.

The use and operation of my invention are as follows:

The coal or ore to be treated enters the vessel through the chute at one side of the conveyor wheel above the level of the liquid in the vessel. The wheel is rotating downwardly toward the bottom of the vessel away from the chute and as the space between each adjacent pair of flights is presented to the chute, that space tends to be partially filled by the coal or other material. The feed will never be rapid enough owing to the size of the chute, to completely fill the space between any two pairs of flights and this, of course, is highly desirable because as each successive, so to speak, bucketful is taken down below the level of the heavy liquid, there is opportunity for stirring and turning over of the material loosely contained between the space of the two flights so that preferably long before the batch reaches the bottom of the vessel, it will have been so moved about that the heavy elements will have sunk to the bottom and the light elements will be at the top.

The bucket flights are rigid and it is highly undesirable that any material be crushed between the bucket flights and the sharp wall of the chute. Therefore, the chute terminates in a series of space springed fingers heavy enough to support the material fed to the apparatus but light enough so that if a piece of coal is caught partly in and partly out of the wheel, the fingers will be depressed and the coal piece will have time to move inwardly and downwardly.

There is thus defined between the spring fingers, the wheel and the outer generally upright portion of the chute, a triangular space into which over-size pieces or pieces caught between the leading edge of the flight may penetrate by depression of the spring fingers and will have time to be guided inwardly into the wheel. Of course, any small particles that pass down between the fingers will be guided into the wheel by gravity without any interference.

The bucket flights are forwardly and outwardly inclined. The result of this is that the space between each pair of flights in which the heavy material is supported, has an inclined angular bottom. Thus, heavy material tends to travel outwardly and downwardly along the perforate floor of each batch area toward the outer periphery of the wheel.

As each flight passes beyond the end of the inner wall enclosing the wheel, it does so at a time when the flight is generally vertical. Thus the light material which has traveled inwardly and upwardly in the batch area is ready to be discharged from the wheel and move upwardly through the mass of liquid through a discharge at the weir. Further, after heavy material travels along the periphery of the vessel, a point is reached at which the flight approaches the horizontal. It tends to have a plowing action therefor to lift the heavy material rather than to push it along the periphery of the vessel and finally at the discharge point, the material may slide inwardly off the flight into the heavy material discharge chute. The inboard and outboard edges of the flights are reinforced as indicated. The bucket-load on the flight is at the outside and there, the angle shown, reinforces the edge that is going to have to scoop or plow the settled material upwardly along the outer periphery of the tank.

With respect to the inboard edge of each flight, the reinforcement is there on the leading face because that enables the release of the light material which tends to float up along the flight toward the inner boundary of the wheel with a surface substantially perpendicular to the curved guide plate, thus minimizing the danger of jamming or cutting and decreasing the friction at that point. In the modified form, the forward and outward curvature of the edge of the plate with the accomplishment of the inner angle, accomplishes much the same purpose.

By the arrangement here shown, the material to be treated is fed through the hopper into the annular ring portion of the vessel, being so controlled that the space between each pair of bucket flights is never entirely filled with solid material. The flexible blades which form the inner portion of the floor of the hopper cooperate with the individual bucket flights so that no degradation occurs because if a particle should be caught between the inner edge of the hopper floor and a flight, the blade forming part of the floor, yields to permit the particle to pass in without crushing.

The importance of not completely filling the space between any two flights arises from the fact that as the individual batches are forced down between the level of the heavy medium traveling along the periphery of the curved vessel walls, the lighter float material tends to rise in the pocket, the heavy material to sink. The turning over of the batch of solid material resulting from its curved part along the periphery of the vessel under the influence of the flights makes it easy for the light material to move up and the heavy material to stay down so that by the time each batch has reached the bottom of the vessel and has been released from the guide plate, the float material will have been segregated at the top and the heavy material at the bottom so that the float material may rise rapidly through the medium without interference from the sink material.

The inclination of the flight downwardly and outwardly in the direction of travel results in the flight being constantly pulled away from the heavy material thus minimizing the pressure and friction of the heavy material against the periphery of the vessel.

As the flight approaches the lower portion of the vessel and passes out from beneath the guard plate 24, it is generally horizontal so it offers no opposition to the direct upward movement of the float material. As the flight continues in its path, it tends to be more and more inclined to the horizontal and exerts a raising and lifting effect on the sink material. Thus the weight of the sink material is gradually transferred from the wall of the vessel to the flight until, as the inner edge of the flight passes upwardly beyond the upper edge of the refuse trough, the material is free to slide down the flight into the trough. Further movement finally brings the flight to a vertical position and later, the heavy material carrying the face of the flight actually overhangs before it passes over the plate 20. Thus there is a free gravity drop of any adherent material from the face of the flight into the trough.

Since the recovery chute and the refuse chute extend laterally from the vessel at points inside the inner periphery of the wheel, an especially compact arrangement is provided. The refuse and recovered material pass out side by side and thus take up less room. This moreover, makes it possible for the cylindrical housing to be continuous except where the feed chute enters and where the housing is perforate to permit the upward flow of heavy medium controlled by the valve 28. The result of this is that leakage, evaporation and contamination are reduced to a minimum. The only openings in the vessel except for the fluid openings, are the two troughs side by side, one leading from the weir, the other carrying the refuse. These with the feed hopper are the only unobstructed openings to the interior of the vessel. While the troughs discharge on opposite sides of the vessel, they might if desired, discharge from the same side.

The plane ends 4 and 5 are spaced somewhat outwardly beyond the fluid distribution hopper 27 to provide room for the supporting rollers 9 and the tracks 50 which form a part of the pocket wheel. The result is that there is a pocket 51 on each side of the vessel at the bottom where fines might gather. Paddles 52 on the outer side of the wheel outside the track 50 rotate in this pocket and pick up any fines which may be deposited in the pocket, raise them so that they will be returned to 2, the separating portion of the vessel.

I claim:

1. In combination, a minerals-separating vessel having a substantially cylindrical peripheral wall disposed about a substantially horizontal axis, plane end walls perpendicular to the axis thereof, a ring member extending from end to end of the vessel and mounted therein for rotation about a substantially horizontal axis, the outer diameter of the ring member being substantially the same as the inner diameter of the cylindrical wall, means for supplying suspension liquid to the vessel, the ring member having circumferentially-spaced flights terminating at the outer periphery of the ring member, said flights defining a peripheral series of material-receiving pockets open at inner and outer ends, the peripheral wall of said vessel being provided with a filling opening through which material to be treated is deposited in said pockets through the open outer ends thereof as they successively pass said opening, a stationary arcuate guard plate within the ring member opposite to said filling opening and having an arcuate extent such as to temporarily close off the openings at the inner ends of the pockets as they pass said filling opening, the lower portion of said guard plate extending below the normal level of liquid in said vessel and being submerged therein, means for rotating the ring member in a direction to move the filled pockets from said filling opening downwardly beneath the surface of the liquid in the vessel, one end wall of the vessel being apertured, the lower boundary of the aperture forming a weir defining the normal liquid level within the vessel and a discharge barrier over which liquid and float material flow in discharge from the vessel, a refuse trough within the vessel inside of the ring member and extending outwardly through one end wall of the vessel for discharge of sink material therefrom, the top of the trough being open and above the liquid level and positioned to receive the sink material discharging from the inner open ends of said pockets as they move upwardly through the liquid due to continued rotation of the ring member.

2. The apparatus described in claim 1 wherein the flights are inclined forwardly in the general direction of rotation of the ring member.

3. The apparatus described in claim 1 wherein a stationary guard member is provided on the approach side of said refuse trough to preclude spillage of the sink material from said pockets prior to arrival at the open top of said trough.

4. The apparatus described in claim 1 wherein a stationary guard member is provided on the approach side of said refuse trough to preclude spillage of the sink material from said pockets prior to arrival at the open top of said trough, the lower edge of said second-mentioned guard member being submerged in the liquid within said vessel.

5. The apparatus described in claim 1 wherein a stationary guard member is provided on the approach side of said refuse trough to preclude spillage of the sink material from said pockets prior to arrival at the open top of said trough, the lower edge of said second-mentioned guard member being submerged in the liquid within said vessel, the submerged edges of the first- and second-mentioned guard members being spaced along the inner periphery of the path of movement of the ring member below the axis of rotation thereof to permit the free rise of buoyant material from the submerged pockets out through the upwardly directed open ends thereof and thence upwardly through the vessel within the ring.

6. The apparatus described in claim 1 wherein a stationary guard member is provided on the approach side of said refuse trough to preclude spillage of the sink material from said pockets prior to arrival at the open top of said trough, the lower edge of said second-mentioned guard member being submerged in the liquid within said vessel, the submerged edges of the first- and second-mentioned guard members being spaced along the inner periphery of the path of movement of the ring member below the axis of rotation thereof to permit the free rise of buoyant material from the submerged pockets out through the upwardly directed open ends thereof and thence upwardly through the vessel within the ring, and at least part of the suspension liquid supplied to the vessel being introduced through an opening provided in the outer cylindrical wall of the vessel substantially radially aligned with the space between the submerged edges of said first- and second-mentioned guard members, for upward flow through the pockets, the inner ends of which are clear of said guard members.

7. The apparatus described in claim 1 wherein the filling opening and said refuse trough are disposed on opposite sides of the axis of rotation of the ring member.

8. The apparatus described in claim 1 wherein the filling opening and said refuse trough are disposed on opposite sides of the axis of rotation of the ring member, and are both positioned above the normal level of liquid in the vessel.

9. The apparatus described in claim 1 wherein a baffle member is provided and extends between the upper edge of said arcuate guard plate and that side of the refuse trough nearest the axis of rotation of the ring member.

10. In combination, a minerals separating vessel having a cylindrical peripheral wall, plane end walls perpendicular to the axis thereof, a wheel extending from end to end of the vessel, the outer periphery of which is substantially the same as the inner diameter of the cylindrical wall, means for rotating the wheel, the wheel having flights extending outwardly, terminating at the outer periphery of the wheel and inclined forwardly in the general direction of the rotation of the wheel, reinforced angles on the opposed edges of the flights, the angles being located on the rearmost faces of the flights at their outer edges and on the front faces of the flights at their inner edges.

11. In combination, a minerals separating vessel having a cylindrical peripheral wall, plane end walls perpendicular to the axis thereof, a wheel extending from end to end of the vessel, the outer periphery of which is substantially the same as the inner diameter of the cylindrical wall, means for rotating the wheel, the wheel having flights extending outwardly, terminating at the outer periphery of the wheel and inclined forwardly in the general direction of the rotation of the wheel, the inboard edges of each flight being reinforced, the reinforcement defining a surface on the front face of each flight, more sharply inclined to be tangent with the inner periphery of the wheel at the point where the flight is located than is the body of the flight.

NELSON L. DAVIS.

REFERENCES CITED

The following references are of record in the file of this patent:

UNITED STATES PATENTS

| Number | Name | Date |
| --- | --- | --- |
| 1,330,179 | Edtbauer | Feb. 10, 1920 |
| 1,988,379 | Chance | Jan. 15, 1935 |
| 2,106,154 | Munro | Jan. 25, 1938 |

FOREIGN PATENTS

| Number | Country | Date |
| --- | --- | --- |
| 463,732 | France | Dec. 24, 1913 |